(12) United States Patent
Yeon et al.

(10) Patent No.: US 10,461,564 B2
(45) Date of Patent: Oct. 29, 2019

(54) COIL STRUCTURE FOR INDUCTIVE AND RESONANT WIRELESS CHARGING TRANSMITTER AND INTEGRAL CONTROL METHOD FOR THE SAME

(71) Applicant: KOREA AUTOMOTIVE TECHNOLOGY INSTITUTE, Cheonan-si (KR)

(72) Inventors: KyuBong Yeon, Seoul (KR); DuHo Lee, Asan-si (KR)

(73) Assignee: KOREA AUTOMOTIVE TECHNOLOGY INSTITUTE, Cheonan-si (KR)

(*) Notice: Subject to any disclaimer, the term of this patent is extended or adjusted under 35 U.S.C. 154(b) by 190 days.

(21) Appl. No.: 15/369,032

(22) Filed: Dec. 5, 2016

(65) Prior Publication Data

US 2018/0152040 A1    May 31, 2018

(30) Foreign Application Priority Data

Nov. 29, 2016  (KR) .......................... 10-2016-0160063

(51) Int. Cl.
*H02J 7/00*   (2006.01)
*H02J 7/14*   (2006.01)
(Continued)

(52) U.S. Cl.
CPC .............. *H02J 7/025* (2013.01); *H02J 7/027* (2013.01); *H02J 7/1461* (2013.01); *H02J 50/10* (2016.02);
(Continued)

(58) Field of Classification Search
USPC ....... 320/107, 108, 109, 110, 101, 137, 164, 320/165
See application file for complete search history.

(56) References Cited

U.S. PATENT DOCUMENTS 8,829,727 B2 * 9/2014 Urano ..................... H02J 5/005
307/104
2012/0157024 A1 * 6/2012 Tsukagoshi .......... H04B 5/0031
455/129
(Continued)

FOREIGN PATENT DOCUMENTS

JP   WO 2015147133 A1 * 10/2015  ............... H01Q 7/06
KR        101342585 B1   12/2013
(Continued)

*Primary Examiner* — Alexis B Pacheco
(74) *Attorney, Agent, or Firm* — Dinsmore & Shohl LLP; Yongsok Choi, Esq.

(57) ABSTRACT

Provided is a wireless power transmitter including a first coil disposed to transmit wireless power, a second coil disposed outside of the first coil to transmit wireless power, and a controller configured to determine whether to operate the wireless power transmitter in a magnetic induction mode or a magnetic resonance mode, control the first coil to operate in the magnetic induction mode and prevent the second coil from operating in the magnetic induction mode in response to the determination to operate the wireless power transmitter in the magnetic induction mode, and control the first coil and the second coil to operate integrally in the magnetic resonance mode in response to the determination to operate the wireless power transmitter in the magnetic resonance mode.

12 Claims, 5 Drawing Sheets

(51) Int. Cl.
  *H02J 7/02* (2016.01)
  *H02J 50/12* (2016.01)
  *H02J 50/10* (2016.01)
  *H02J 50/60* (2016.01)
(52) U.S. Cl.
  CPC ............ *H02J 50/12* (2016.02); *H02J 7/0044* (2013.01); *H02J 50/60* (2016.02)

(56) References Cited

U.S. PATENT DOCUMENTS

| | | | |
|---|---|---|---|
| 2014/0091756 A1* | 4/2014 | Ofstein | H02J 5/005 320/108 |
| 2014/0375262 A1* | 12/2014 | Yamaguchi | H02J 50/90 320/108 |
| 2015/0015083 A1* | 1/2015 | Nakase | H02J 50/05 307/104 |
| 2015/0061590 A1* | 3/2015 | Widmer | B60L 11/182 320/108 |
| 2015/0130409 A1* | 5/2015 | Lee | H02J 17/00 320/108 |
| 2015/0180253 A1* | 6/2015 | Park | H02J 7/0021 320/108 |
| 2016/0020633 A1* | 1/2016 | Han | H02J 17/00 320/108 |
| 2016/0056664 A1* | 2/2016 | Partovi | H02J 7/025 307/104 |
| 2016/0064814 A1* | 3/2016 | Jang | H01Q 1/526 343/842 |
| 2016/0094075 A1* | 3/2016 | Tseng | H02J 50/10 320/108 |
| 2016/0172893 A1* | 6/2016 | Yoon | H02J 7/025 320/108 |
| 2016/0197489 A1* | 7/2016 | Kurs | H01F 38/14 320/108 |
| 2017/0005399 A1* | 1/2017 | Ito | H01Q 7/06 |
| 2017/0187229 A1* | 6/2017 | Hosseini | H02J 7/025 |

FOREIGN PATENT DOCUMENTS

| | | | |
|---|---|---|---|
| KR | 101503221 B1 | 3/2015 | |
| WO | WO-2015147133 A1 * | 10/2015 | ............... H01Q 7/06 |

* cited by examiner

COIL STRUCTURE FOR INDUCTIVE AND RESONANT WIRELESS CHARGING TRANSMITTER AND INTEGRAL CONTROL METHOD FOR THE SAME

CROSS-REFERENCE TO RELATED APPLICATION(S)

This application claims priority to Korean Patent Application No. 10-2016-0160063 filed on Nov. 29, 2016, the entire contents of which are incorporated herein by reference.

BACKGROUND

1. Field

One or more example embodiments relate to an inductive and resonant wireless charging transmitter and a control method for the same, and more particularly, to technology that implements a coil structure in which an induction coil and a resonance coil of a wireless charging transmitter are integrated and an integral control method for the same.

2. Description of Related Art

Wireless charging or wireless power transmission and reception technology is technology that charges a battery by transmitting electric energy without wires. In general, an electromagnetic field is used to transmit electric energy. Current wireless charging technology charges a battery using a transmitter and a receiver through induction of an electromagnetic field.

Wireless charging technology is divided into magnetic inductive charging and magnetic resonant charging by transmission schemes. The magnetic inductive charging is a contact-type wireless charging technology that transmits power of few watts (W) and few kilowatts (kW) at a close distance within at most few centimeters (cm) using electromagnetic induction between a primary coil and a secondary coil, and has a relatively high transmission efficiency at a short distance. The magnetic resonant charging is a short-distance wireless charging technology that transmits power at a close distance of tens of cm using resonance between a primary coil and a secondary coil. The magnetic resonant charging may have advantages of transmitting power at a relatively great distance when compared to the magnetic inductive charging, having a certain degree of freedom with respect to an alignment between the coils, and charging multiple products simultaneously. However, the magnetic resonant charging has a disadvantage of low transmission efficiency when compared to the magnetic inductive charging.

To overcome the disadvantage of inductive wireless charging which is applied to low-power mobile devices such as smart phones, a need for an integral wireless charging transmitter that may provide both the magnetic inductive charging and the magnetic resonant charging is increasing.

SUMMARY

An aspect provides an inductive and resonant wireless charging transmitter and a control method for the same that may support both an induction type terminal and a resonance type terminal, and utilize a high charging efficiency of inductive charging and a convenience of resonant charging.

Another aspect also provides a structure in which an induction coil and a resonance coil are integrated that may increase a charging efficiency by operating both the coils as resonance coils for resonant charging.

Another aspect also provides an inductive and resonant wireless charging transmitter and a wireless power transmitting method that may increase a user convenience in a restricted space and a moving environment such as a vehicle.

The technical tasks obtainable from the present disclosure are non-limited by the above-mentioned technical tasks. And, other unmentioned technical tasks can be clearly understood from the following description by those having ordinary skill in the technical field to which the present disclosure pertains.

According to an aspect, there is provided a wireless power transmitter including a first coil disposed to transmit wireless power, a second coil disposed outside of the first coil to transmit wireless power, and a controller configured to determine whether to operate the wireless power transmitter in a magnetic induction mode or a magnetic resonance mode, control the first coil to operate in the magnetic induction mode and prevent the second coil from operating in the magnetic induction mode in response to the determination to operate the wireless power transmitter in the magnetic induction mode, and to control the first coil and the second coil to operate integrally in the magnetic resonance mode in response to the determination to operate the wireless power transmitter in the magnetic resonance mode.

The first coil and the second coil may be configured to operate as magnetic resonance coils in the magnetic resonance mode. The wireless power transmitter may further include an electro-band gap (EBG) structure disposed to enclose an outside of the second coil to improve a transmission efficiency. The first coil may be wound in a circular shape, and the second coil may be wound in a rectangular shape.

According to another aspect, there is also provided a wireless power transmitter including a substrate of which at least a portion has a curved surface, a first coil disposed on the substrate to transmit wireless power, a second coil wound along the curved surface of the substrate at a position spaced apart from the first coil to transmit wireless power, the second coil having a greater diameter than the first coil, and a controller configured to determine whether to operate the wireless power transmitter in a magnetic induction mode or a magnetic resonance mode, control the first coil to operate in the magnetic induction mode and prevent the second coil from operating in the magnetic induction mode in response to the determination to operate the wireless power transmitter in the magnetic induction mode, and to control the first coil and the second coil to operate integrally in the magnetic resonance mode in response to the determination to operate the wireless power transmitter in the magnetic resonance mode.

The first coil and the second coil may be configured to operate as magnetic resonance coils in the magnetic resonance mode. Both the first coil and the second coil may be wound in circular shapes.

According to still another aspect, there is also provided a method of transmitting wireless power in a vehicle, the method including detecting at least one terminal capable of receiving wireless power in the vehicle and determining whether each detected terminal supports magnetic resonant wireless power reception or magnetic inductive wireless power reception, providing magnetic inductive wireless power transmission by turning on a first coil disposed to transmit wireless power and turning off a second coil disposed outside of the first coil in response to determination that a magnetic induction mode is needed, and providing magnetic resonant wireless power transmission to the terminal by integrally operating the first coil and the second coil in response to determination that a magnetic resonance mode is needed.

The method may further include determining that the magnetic resonance mode is needed in a case in which interference occurs between an operating frequency of the first coil and a frequency used by an electronic device in the vehicle. The method may further include providing an alarm associated with charging state information of the terminal. The charging state information of the terminal may include at least one of whether charging is being performed, a charging condition, or whether a foreign object is detected.

Additional aspects of example embodiments will be set forth in part in the description which follows and, in part, will be apparent from the description, or may be learned by practice of the disclosure.

EFFECTS

According to an example embodiment, an inductive and resonant wireless charging transmitter and a control method for the same may support both an induction type terminal and a resonance type terminal, and utilize a high charging efficiency of inductive charging and a convenience of resonant charging.

According to an example embodiment, a structure in which an induction coil and a resonance coil are integrated may increase a charging efficiency by operating both the coils as resonance coils for resonant charging.

According to an example embodiment, an inductive and resonant wireless charging transmitter and a wireless power transmitting method may increase a user convenience in a restricted space and a moving environment such as a vehicle.

The effects obtainable from the present disclosure are non-limited by the above-mentioned effects. And, other unmentioned effects can be clearly understood from the following description by those having ordinary skill in the technical field to which the present disclosure pertains.

BRIEF DESCRIPTION OF THE DRAWINGS

These and/or other aspects, features, and advantages of the disclosure will become apparent and more readily appreciated from the following description of example embodiments, taken in conjunction with the accompanying drawings of which.

DETAILED DESCRIPTION

Hereinafter, the present disclosure will be described in detail with reference to the accompanying drawings, in which example embodiments are shown. However, those skilled in the art would realize that described example embodiments may be modified in various different ways, all without departing from the sprit or scope of the present disclosure.

The terminology used herein is for the purpose of describing particular example embodiments only and is not intended to be limiting of example embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the example embodiments will be described in detail with reference to the accompanying drawings. The configuration and operation effects of the present disclosure will be clearly understood from the following detailed description.

Figure 1:
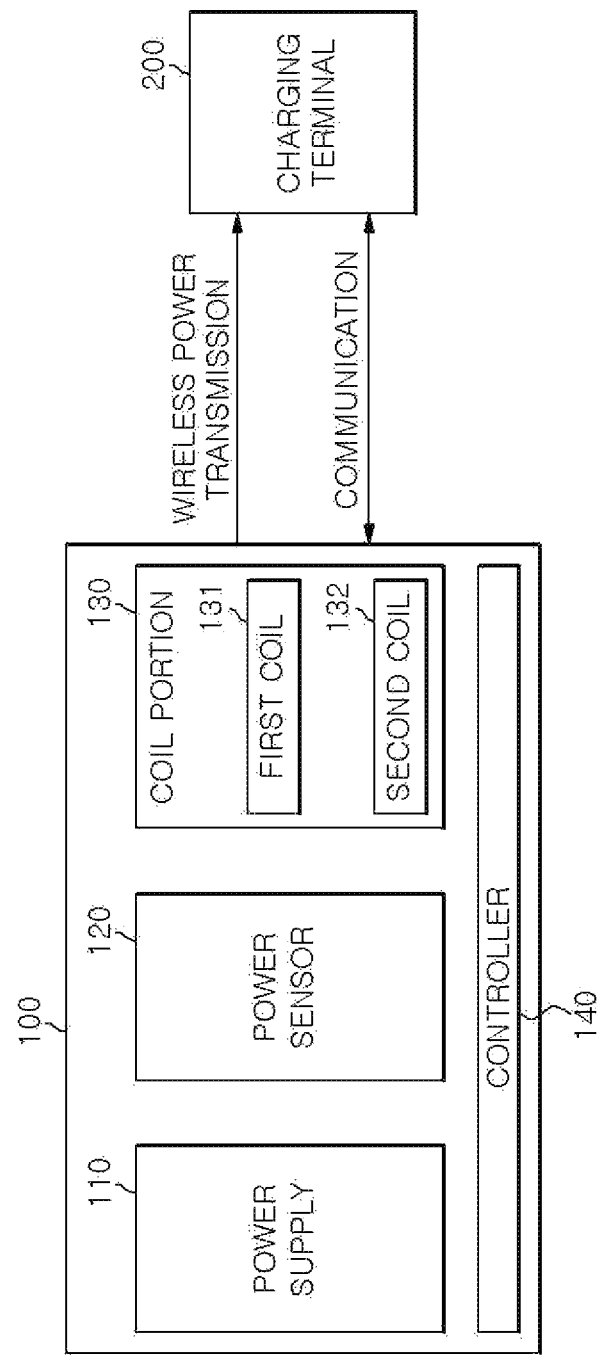
FIG. 1 is a diagram illustrating an inductive and resonant wireless power transmission system according to an example embodiment.

FIG. 1 is a diagram illustrating an inductive and resonant wireless power transmission system according to an example embodiment. Referring to FIG. 1, the wireless power transmission system may include a wireless charging apparatus which is a wireless power transmitter 100 configured to transmit wireless power, and a charging terminal 200 which is a wireless power receiver configured to receive wireless power.

The wireless power transmitter 100 may include a power supply 110, a power sensor 120, a coil portion 130, and a controller 140, and may further include various other components necessary for transmitting wireless power. The wireless power transmitter 100 may communicate with the charging terminal 200. For example, the wireless power transmitter 100 may perform in-band communication using a magnetic field channel which is an operating frequency band for wireless charging in an induction mode, and perform out-of-band communication using the industrial, scientific and medical (ISM) band which is a frequency band higher than the operating frequency of inductive charging, for example, using Bluetooth low energy (LE) of 2.4 gigahertz (GHz). However, the communication methods are not limited thereto. Further, the operating frequency band for wireless power transmission may vary with a wireless charging standard and an induction or resonance scheme.

The power supply 110 of the wireless power transmitter 100 may provide power. The power provided from the power supply 110 may be finally converted into a wireless power signal at the coil portion 130 and transmitted to the charging terminal 200. Here, the wireless power signal may have a form of magnetic field or electromagnetic field generated at the coil portion 130. Further, although not shown in FIG. 1, the wireless power transmitter 100 may further include an inverter configured to convert a direct current provided from the power supply 110 into an alternating current.

The power sensor 120 of the wireless power transmitter 100 may measure, sense and monitor a value of current or voltage flowing through the coil portion 130. The power sensor 120 may determine whether the value of current or voltage measured at the coil portion 130 based on a value of current or voltage supplied from the power supply 110 exceeds a threshold value. In a case of malfunction such as foreign object detection (FOD), power supplied from the power sensor 120 may be blocked through the controller 140. Although not shown in FIG. 1, the wireless power transmitter 100 may further include an impedance matching circuit configured to adjust an impedance for frequency resonance for resonant wireless power transmission. An impedance matching operation of the impedance matching circuit may be controlled by the controller 140.

The coil portion 130 of the wireless power transmitter 100 may generate a wireless power signal in a form of magnetic field or electromagnetic field based on a change in current applied thereto. The coil portion 130 may include a plurality of coils, for example, a first coil 131 and a second coil 132 as shown in FIG. 1. The first coil 131 may have a structure of an induction coil for magnetic inductive transmission, and the second coil 132 may have a structure of a resonance coil for magnetic resonant transmission. Further, the first coil 131 and the second coil 132 may be integrally controlled by the controller 140. Thus, the controller 140 may control the first coil 131 which is the induction coil to operate and the second coil 132 which is the resonance coil to not operate for magnetic inductive transmission, and may control the first coil 131 and the second coil 132 to operate integrally as resonance coils for magnetic resonant transmission. The operation of integrally controlling the coil portion 130 will be described further with reference to FIG. 2.

Figure 2:
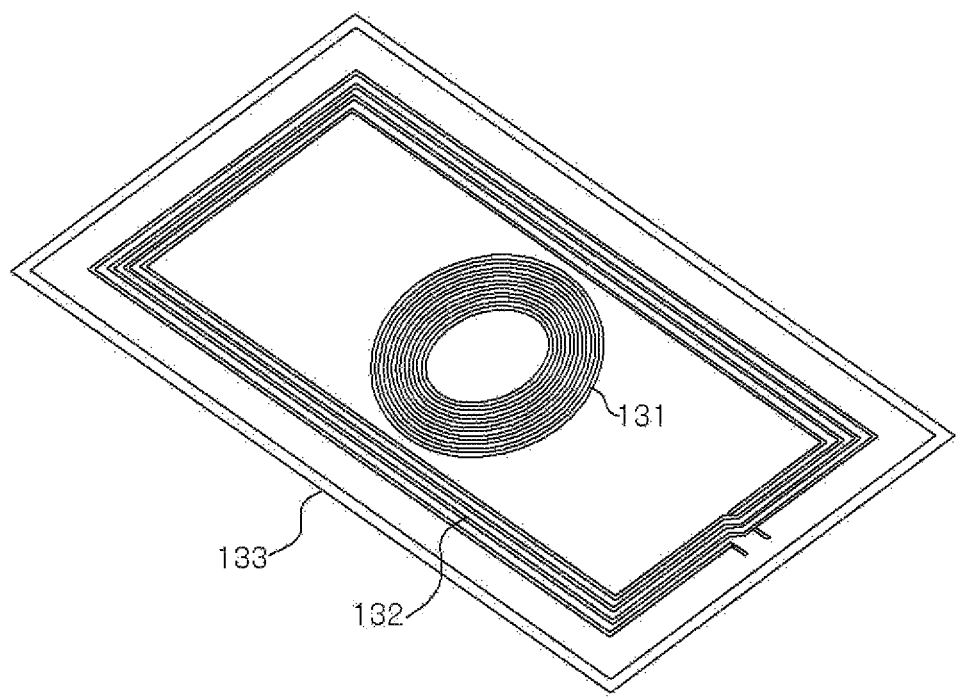
FIG. 2 illustrates a structure of a coil portion of an inductive and resonant wireless charging transmitter according to an example embodiment.

FIG. 2 illustrates a structure of the coil portion 130 of the inductive and resonant wireless charging transmitter 100 according to an example embodiment. The coil portion 130 may include the first coil 131 wound at a center thereof, the second coil 132 wound outside of the first coil 131, and an electro-band gap (EBG) structure 133 disposed outside of the second coil 132.

The first coil 131 may have a circular shape which is the same as that of a widely used inductive wireless charging coil, and the second coil 132 may have a rectangular shape which is the same as that of a widely used resonant wireless charging coil. The second coil 132 may be disclosed outside of the first coil 131 to be spaced apart from the first coil 131. The first coil 131 and the second coil 132 may be implemented in various forms, for example, a planar spiral form or a cylindrical solenoid form. However, example embodiments are not limited thereto.

The coil portion 130 may provide two types of wireless power transmission, inductive wireless power transmission and resonant wireless power transmission, through integral control of the first coil 131 and the second coil 132. Thus, the coil portion 130 may support both a terminal supporting the inductive wireless power transmission and a terminal supporting the resonant wireless power transmission, and utilize a high charging efficiency of the inductive wireless power transmission and a convenience of the resonant wireless power transmission. In particular, the coil portion 130 may allow, through a control operation of the controller 140, the first coil 131 to operate and the second coil 132 to not operate in a magnetic induction mode, thereby achieving a high charging efficiency in a case of the induction mode. Further, the coil portion 130 may integrally control, through the controller 140, the first coil 131 disposed at the center and the second coil 132 disposed outside of the first coil 131 in a magnetic resonance mode, thereby using the first coil 131 and the second coil 132 as resonance coils for the resonant wireless power transmission.

Although FIG. 2 illustrates the first coil 131 as a single circular coil, the first coil 131 may include a plurality of coils for inductive charging, for example, at least two or three circular coils. As a greater number of circular coils are provided, an area of the coils may increase and thus, a charging range and a charging efficiency may increase as well.

Based on the integral control method, charging through the first coil 131 of the wireless power transmitter 100 may be performed when a receiver that supports the inductive wireless power transmission is at a charging position, that is, a central portion of the wireless power transmitter 100 at which the first coil 131 is disposed. Further, in a case in which a resonance type receiver is disposed at the central position, by integrally operating the first coil 131 disposed at the center and the second coil 132 disposed outside of the first coil 131 as resonance coils, a disadvantage of a relatively low electric field formed at an intra-central portion when wireless power is transmitted only using the second coil 132 may be overcome. Accordingly, by increasing an absolute area of the entire resonance coil in the magnetic resonance mode, the transmission efficiency may increase, and a disadvantage of a relatively low charging efficiency at a central portion of a charger may be overcome.

Referring to FIG. 2, the EBG structure 133 may be disposed outside of the first coil 131 and the second coil 132, such that a radiation pattern may be concentrated in a transmission direction, whereby the overall charging efficiency may increase and the disadvantage of the relatively low charging efficiency of the resonant wireless power transmission, when compared to the inductive wireless power transmission, may be overcome.

The EBG structure 133 is a structure in which a unit cell structure having a predetermined shape is repeated periodically. The EBG structure 133 may have a structure with a frequency-selective characteristic by arranging two materials having different dielectric constants repetitively at predetermined intervals, and changing a wave impedance periodically, and may have a band stop characteristic that blocks an electromagnetic wave in a predetermined frequency band. The EBG structure 133 may be applied to a coil antenna for wireless power transmission and used as a substrate in which the antenna is disposed. In a case in which the EBG structure 133 is used as the substrate of the antenna, a surface wave generated when a high-permittivity substrate is used may decrease, and thus a radiation characteristic and a gain of the antenna may improve. For example, the EBG structure 133 may be configured using a radiation source and a Fabry-Perot cavity including a ground plane and a cover layer that acts as a partial reflecting surface.

Figure 3:
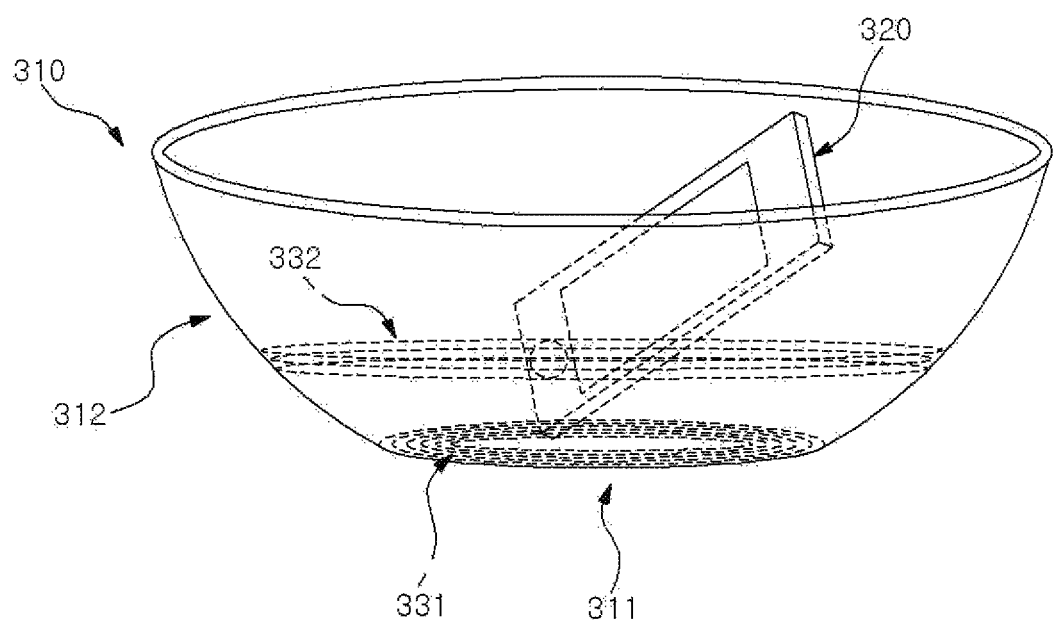
FIG. 3 illustrates a structure of a curved wireless power transmitter according to an example embodiment.

FIG. 3 illustrates a structure of a curved wireless power transmitter according to an example embodiment. Referring to FIG. 3, when a wireless power receiver 320, for example, at least a portion of a charging terminal such as a smart phone, is placed in a wireless power transmitter 310 having a curved portion 312, wireless power transmission may be performed.

The curved wireless power transmitter 310 may include the curved portion 312 on a side thereof, and a planar portion 311 on a bottom thereof. A first coil 331 disposed in a circular shape on the planar portion 311 and a second coil 332 wound in a circular shape along the curved portion 312 may be spaced apart from each other. Thus, when viewing the wireless power transmitter 310 having the curved portion 312 from the front, the second coil 332 wound along the curved portion 312 may be disposed at a higher position than the first coil 331 disposed on the planar portion 311.

The first coil 331 and the second coil 332 of the wireless power transmitter 310 may be integrally controlled through the controller 140. For example, when the curved wireless power transmitter 310 operates in a magnetic induction mode, the controller 140 may control only the first coil 331 on the planar portion 311 to operate as an induction coil and the second coil 132 to not operate. Further, in a case in which the wireless power transmitter 310 operates in a magnetic resonance mode, the controller 140 may integrally control the first coil 331 on the planar portion 311 and the second coil 332 wound along the curved portion 312, thereby using the first coil 331 and the second coil 332 as resonance coils for resonant wireless power transmission.

Accordingly, in a case in which inductive charging is available when the wireless power receiver 320 is placed on the planar portion 311, the wireless power transmitter 310 may operate in the induction mode. In a case in which resonant charging is available, both the first coil 331 and the second coil 332 may operate as resonance coils, whereby resonant charging may be provided. As described above, by disposing a resonance coil which is the second coil 332 along a curved surface, a heat radiation characteristic may improve and the receiver may be arranged at a position within an allowable range, in addition to the advantage of the integral coil structure of FIG. 2. Further, through the curved structure, a charging space may be provided regardless of a size of a terminal, and an inductive and resonant transmitter which is relatively free from an alignment constraint of a terminal in a restricted and moving space, for example, in a vehicle, may be provided.

Figure 4:
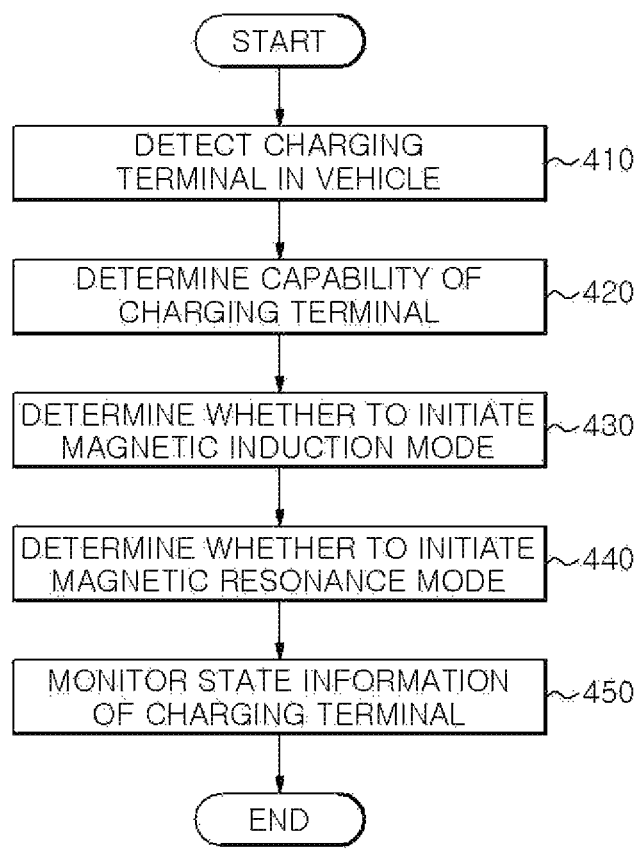
FIG. 4 is a flowchart illustrating an inductive and resonant wireless power transmission method for a vehicle according to an example embodiment.

FIG. 4 is a flowchart illustrating an inductive and resonant wireless power transmission method for a vehicle according to an example embodiment.

Referring to FIG. 4, in operation 410, the wireless power transmitter 100 may detect at least one charging terminal capable of receiving wireless power in a vehicle. In operation 420, the wireless power transmitter 100 may determine whether each detected terminal supports magnetic resonant wireless power reception or magnetic inductive wireless power reception, and obtain and determine information related to wireless charging capability of each terminal through communication with the terminal.

In operation 430, in response to determination that a magnetic induction mode is needed, the wireless power transmitter 100 may perform inductive charging by initiating the magnetic induction mode. For example, in response to determination that inductive charging is available to the charging terminal 200 through a magnetic field communication when the charging terminal 200 is placed on an induction coil, the wireless power transmitter 100 may provide wireless power transmission through the induction coil in the magnetic induction mode.

In operation 440, in response to determination that a magnetic resonance mode is needed as the magnetic induction mode is unavailable, the wireless power transmitter 100 may perform resonant charging by initiating the magnetic resonance mode. For example, in a case in which the charging terminal 200 supports only resonant charging and does not support inductive charging, in a case in which only resonant charging is available in a current position or environment of the charging terminal 200 although the charging terminal 200 supports both inductive charging and resonant charging, or in a case in which a plurality of charging terminals 200 need to be charged, the wireless power transmitter 100 may determine that the magnetic resonance mode is needed and operate resonance coils. As shown in FIGS. 2 and 3, in a case in which the first coil and the second coil are integrally operable as resonance coils, a charging efficiency may increase by using both the coils as resonance coils in the magnetic resonance mode.

In operation 450, the wireless power transmitter 100 may continuously monitor state information of the charging terminal 200. For example, the state information of the charging terminal 200 may be associated with at least one of whether charging is being performed, a charging condition, or whether a foreign object is detected. However, example embodiments are not limited thereto. The wireless power transmitter 100 may further provide an alarm associated with charging state information of the charging terminal 200. For example, when a foreign object is detected, the wireless power transmitter 100 may provide a user with a warning alarm using at least one of a sound or an image.

Figure 5:
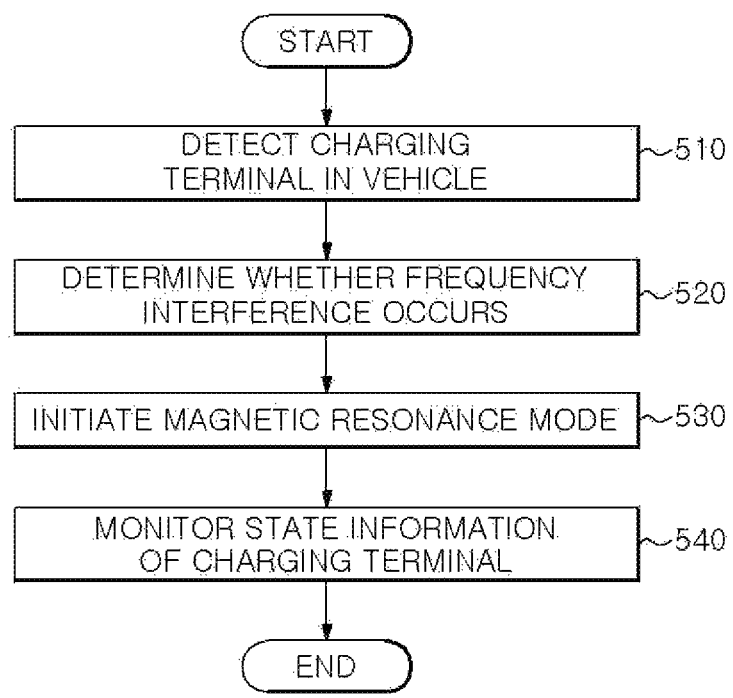
FIG. 5 is a flowchart illustrating an inductive and resonant wireless power transmission method for a vehicle to avoid frequency interference according to an example embodiment.

FIG. 5 is a flowchart illustrating an inductive and resonant wireless power transmission method for a vehicle to avoid frequency interference according to an example embodiment.

Referring to FIG. 5, in operation 510, the wireless power transmitter 100 may detect at least one terminal capable of receiving wireless power in a vehicle. The wireless power transmitter 100 may obtain and determine information related to wireless charging capability of each terminal through communication with the terminal.

In operation 520, the wireless power transmitter 100 may determine whether there is interference between an operating frequency of wireless charging and a frequency used by another electronic device in the vehicle. For example, the wireless power transmitter 100 may receive information regarding whether an electronic device such as a smart key is present from an electronic system of the vehicle, or determine whether a smart key is present by receiving a signal from the smart key. In this example, the wireless power transmitter 100 may determine that frequency interference occurs since an operating frequency band of an induction coil for inductive charging, for example, a band from 110 kilohertz (KHz) to 205 KHz, overlaps an operating frequency band of the smart key, for example, 125 KHz.

In operation 530, in response to determination that frequency interference occurs in the frequency band of inductive charging, the wireless power transmitter 100 may initiate a magnetic resonance mode. Since when compared to inductive charging, resonant charging uses a relatively high frequency band, for example, 6.78 megahertz (MHz), frequency interference with an electronic device such as the smart key may not occur. Thus, in a case in which there is a risk of frequency interference with another electronic device, a possibility of frequency interference may be eliminated by initiating the magnetic resonance mode as default.

In operation 540, the wireless power transmitter 100 may continuously monitor state information of the charging terminal 200. The wireless power transmitter 100 may further provide an alarm associated with charging state information. For example, in response to determination that a risk of frequency interference occurs, the wireless power transmitter 100 may provide a user with a warning alarm using at least one of a sound or an image.

The operation of initiating the magnetic resonance mode may avoid frequency interference with various types of electronic devices provided in the vehicle, thereby reducing a risk of accident caused by malfunction of the vehicle.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power transmitter, comprising:
   a first coil disposed to transmit wireless power;
   a second coil disposed outside of the first coil to transmit wireless power; and
   a controller configured to:
      determine whether to operate the wireless power transmitter in a magnetic induction mode or a magnetic resonance mode;
      in the magnetic induction mode, control the first coil to transmit wireless power in the magnetic induction mode and control the second coil not to transmit wireless power; and
      in the magnetic resonance mode, control both the first coil and the second coil to transmit wireless power in the magnetic resonance mode.

2. The wireless power transmitter of claim 1, wherein the first coil and the second coil are configured to operate as magnetic resonance coils in the magnetic resonance mode.

3. The wireless power transmitter of claim 1, further comprising:
   an electro-band gap (EBG) structure disposed to enclose an outside of the second coil to improve a transmission efficiency.

4. The wireless power transmitter of claim 1, wherein the first coil is wound in a circular shape, and the second coil is wound in a rectangular shape.

5. A wireless power transmitter, comprising:
   a substrate of which at least a portion has a curved surface;
   a first coil disposed on the substrate to transmit wireless power;
   a second coil wound along the curved surface of the substrate at a position spaced apart from the first coil to transmit wireless power, the second coil having a greater diameter than the first coil; and
   a controller configured to:
      determine whether to operate the wireless power transmitter in a magnetic induction mode or a magnetic resonance mode;
      control the first coil to operate in the magnetic induction mode and prevent the second coil from operating in the magnetic induction mode in response to the determination to operate the wireless power transmitter in the magnetic induction mode; and
      control the first coil and the second coil to operate integrally in the magnetic resonance mode in response to the determination to operate the wireless power transmitter in the magnetic resonance mode.

6. The wireless power transmitter of claim 5, wherein the first coil and the second coil are configured to operate as magnetic resonance coils in the magnetic resonance mode.

7. The wireless power transmitter of claim 5, wherein both the first coil and the second coil are wound in circular shapes.

8. A method of transmitting wireless power in a vehicle, the method comprising:
   detecting at least one terminal capable of receiving wireless power in the vehicle and determining whether each detected terminal supports magnetic resonant wireless power reception or magnetic inductive wireless power reception;
   providing magnetic inductive wireless power transmission to the terminal by turning on a first coil disposed to transmit wireless power and turning off a second coil disposed outside of the first coil in response to determination that a magnetic induction mode is needed; and
   providing magnetic resonant wireless power transmission to the terminal by integrally operating the first coil and the second coil in response to determination that a magnetic resonance mode is needed.

9. The method of claim 8, further comprising:
   determining that the magnetic resonance mode is needed in a case in which interference occurs between an operating frequency of the first coil and a frequency used by an electronic device in the vehicle.

10. The method of claim 8, further comprising:
    providing an alarm associated with charging state information of the terminal.

11. The method of claim 10, wherein the charging state information of the terminal comprises at least one of whether charging is being performed, a charging condition, or whether a foreign object is detected.

12. The wireless power transmitter of claim 1, wherein the controller is further configured to:
    turn on the first coil to operate in the magnetic induction mode and turn off the second coil in response to the determination to operate the wireless power transmitter in the magnetic induction mode.

* * * * *